Nov. 8, 1932.  J. B. RODGERS  1,886,977
AUXILIARY WHEEL
Filed June 1, 1931  2 Sheets-Sheet 1

Inventor
John B. Rodgers
By C. A. Snow & Co.
Attorneys

Nov. 8, 1932.　　　J. B. RODGERS　　　1,886,977
AUXILIARY WHEEL
Filed June 1, 1931　　　2 Sheets-Sheet 2

Inventor
John B. Rodgers
By C. A. Snow & Co.
Attorneys.

Patented Nov. 8, 1932

1,886,977

UNITED STATES PATENT OFFICE

JOHN B. RODGERS, OF LITTLE ROCK, ARKANSAS

AUXILIARY WHEEL

Application filed June 1, 1931. Serial No. 541,404.

By way of explanation, it may be stated that even with the most improved means for changing a tire on an automobile wheel, when the tire goes flat, tire-changing is a dirty and time-consuming job, requiring not only the loosening of the nuts but requiring, as well, the use of a jack and much work under or about a car. The foregoing being understood, it may be stated that this invention aims to provide a simple but effective means whereby an auxiliary wheel may be assembled with a main wheel which has a flat tire, simply by placing the auxiliary wheel against the main wheel and driving away in the vehicle, there being no occasion for loosening bolts, taking out a jack, and resorting to all of the operations commonly necessary in connection with a flat tire.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

The numeral 1 marks the body of a wheel on an automobile, and this wheel may conveniently be referred to as the main wheel. Although, for simplicity in explaining the invention, the wheel body 1 has been shown in the form of a disk, it will be understood that the invention is by no means confined to a disk wheel, and that it can be used on a wheel of any known construction. The wheel body 1 carries a pneumatic tire 2.

Figure 2:
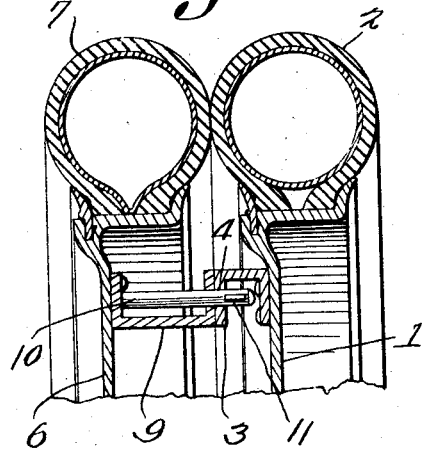
Figure 2 is a transverse section showing the wheels side by side, parts being broken away.

On the wheel body 1, there are outwardly projecting brackets 3. The brackets 3 are U-shaped, as shown in Figure 2, and open toward the center of the wheel. In the outer portions of the brackets 3, there are holes 4. The wheel body 1 carries an outwardly projecting shoulder 5, which may be an angle bracket.

The device comprises an auxiliary wheel, the body of which is designated by the numeral 6. The wheel body 6 is shown in the form of a disk, but a disk is not necessary, as has been explained hereinbefore, in connection with the wheel body 1, and the auxiliary wheel body 6 may be of any desired construction. On the wheel body 6 is mounted a tire 7, pneumatic or otherwise. The wheel body 6 has a large central opening 8 located opposite the hub-cap of the main wheel.

Figure 4:
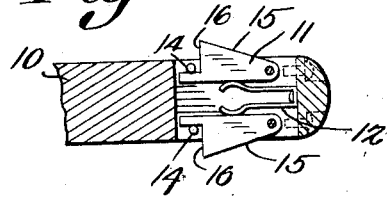
Figure 4 is a sectional view of the pivot elements of the auxiliary wheel.
Figure 5:
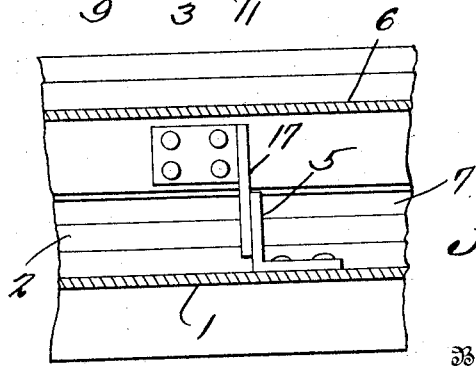
Figure 5 is a sectional view showing the stop members on the wheels in operative relation to each other.
Figure 6:
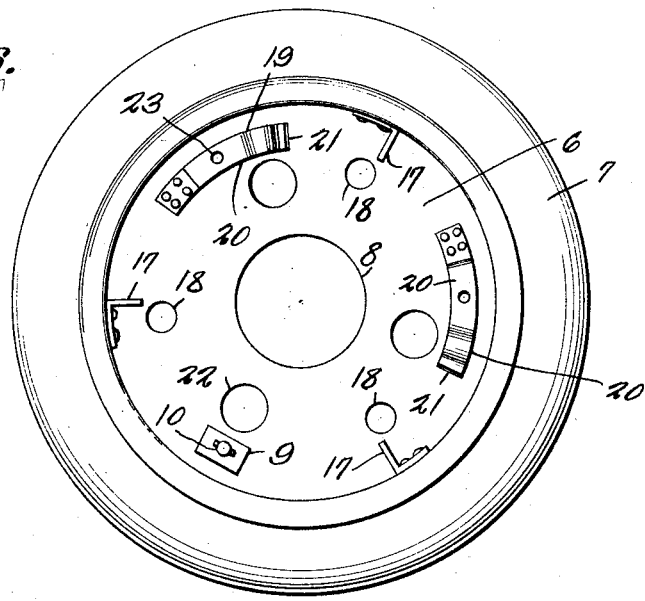
Figure 6 is a side elevation of the auxiliary wheel.
Figure 7:
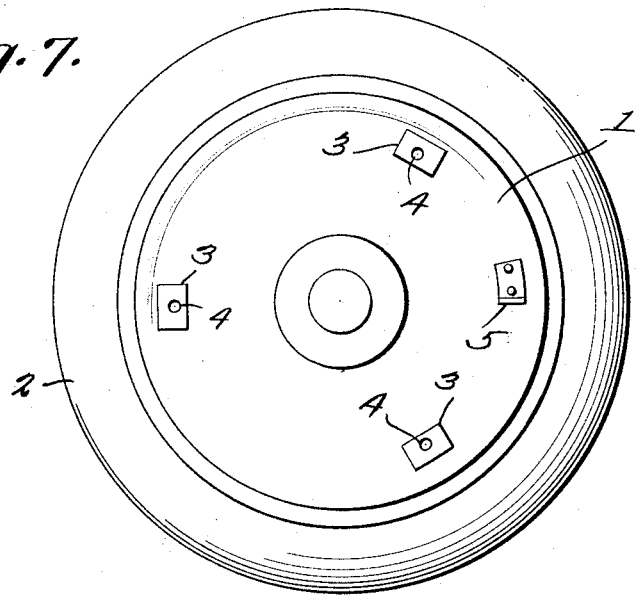
Figure 7 is a side elevation of the main wheel.

To the side of the auxiliary wheel body 6 is secured an inwardly projecting bracket 9, and in the bracket 9 is secured a transverse pivot element 10, such as a pin. Figure 4 shows that in the inner end of the pin there is a transverse recess, in which latches 11 are pivotally mounted. The latches 11 are pressed outwardly by a spring 12 carried by the outer end portion of the pivot pin 10, and the spring causes the inner ends of the latches 11 to engage stops 14 mounted on the pivot pin, within the recess. The latches 11 are provided with bevelled edges 15, leading backwardly to transverse shoulders 16. The wheel body 6 carries inwardly projecting shoulders 17, which may be brackets, mounted on the rim of the wheel body, or elsewhere. Inspection openings 18 are formed in the wheel body 6, adjacent to the shoulders or brackets 17.

Figure 3:
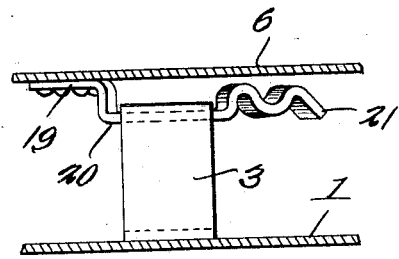
Figure 3 is a sectional view disclosing one of the latches and the part with which is cooperates.

Resilient, circumferentially extended latches 19 are secured to the wheel body 6 and have holes 23. Each of the latches 19 is provided with a loop-shaped seat 20, and each latch has an end 21 which is inclined away from the wheel body 6, as Fig. 3 will show. The wheel body 6 has openings 22 located adjacent to the ends 21 of the latches 19, and giving access thereto.

Figure 1:
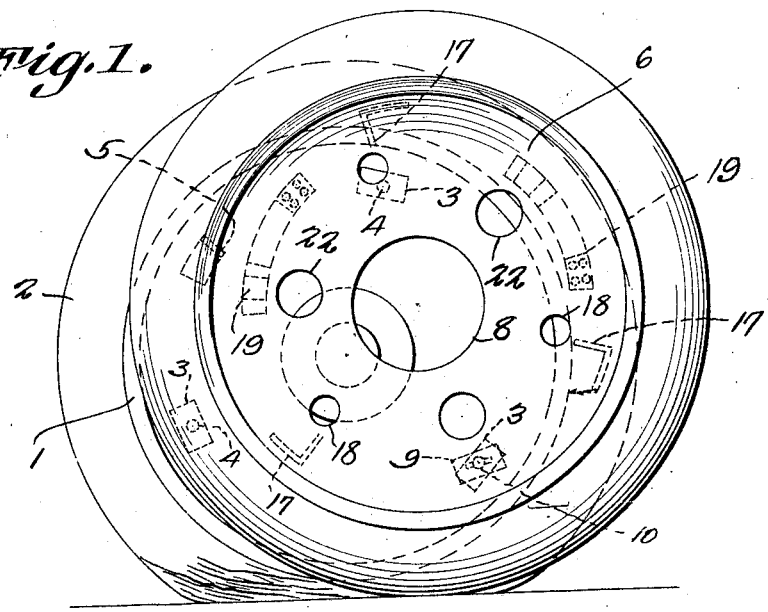
Figure 1 shows in side elevation a device constructed in accordance with the invention, the auxiliary wheel being in the process of application to the main wheel.

Suppose that the tire 2 on the main wheel body 1 goes flat, as shown in Figure 1. Then the pivot pin 10 on the auxiliary wheel body 6 is inserted into the opening 4 of the bracket 3 on the wheel body 1 which is placed most conveniently with respect to the ground, the tire 7 on the auxiliary wheel body 6 resting on the ground, as shown in Figure 1, in eccentric relation to the main wheel. As the pin 10 is inserted into the opening 4 of the racket 3, the latches 11 move inwardly and then swing outwardly to the position of Figure 4, under the action of the spring 12, the pivot pin 10 being held in the bracket 3 against withdrawal, as shown in Figure 2.

When the automobile is started, the tire 7 on the auxiliary wheel 6 rolls on the ground, the flat tire 2 of the main wheel is lifted off the ground, and the wheels move into concentric relation to each other. As the wheels move toward concentric relation to each other, the latches 19 on the wheel body 6 engage with the brackets 3 on the wheel body 1 which are not connected to the pivot pin 10 on the wheel body 6, the said brackets are received in the seats 20 of the latches 19, and the wheels are held together, in concentric relation, all of the weight being taken off of the flat tire 2. As the wheels arrive at concentric relation, the shoulder 5 on the wheel body 1 comes in contact with one of the shoulders 17 on the wheel body 6, to form a positive abutment.

In order to disengage the latches 19 from the brackets 3, a suitable tool (not shown) may be inserted through openings 22 in the wheel body 6.

The device is simple in construction, and it affords an efficient means whereby time and labor may be saved when a flat tire occurs, the device being of utility to anyone who wishes to save time, or to avoid the soiling labor incident to changing a tire on the road according to known methods of procedure.

The holes 23 in the latches 19 are for the purpose of attaching two auxiliary wheels together, for convenience in carrying on the rack for the spare on the car.

Having thus described the invention, what is claimed is:—

1. In a device of the class described, main and auxiliary wheels, the main wheel having a plurality of circumferentially spaced brackets provided with openings, the auxiliary wheel having a pivot element which may be inserted into the opening of any bracket to effect a detachable pivotal connection between the wheels, with the wheels in eccentric relation, the auxiliary wheel having a latch which engages another of the brackets, as the auxiliary wheel rolls on the ground, and as the auxiliary wheel moves toward concentric relation with respect to the main wheel, to lock the wheels together.

2. In a device of the class described, a main wheel having an opening, an auxiliary wheel, means for effecting a detachable pivotal connection between the wheels, with the wheels in eccentric relation, said means embodying a pin on the auxiliary wheel, received in the opening of the main wheel, and a latch on the pin, the latch engaging automatically with the main wheel to prevent withdrawal of the pin from the opening; and means for automatically locking the wheels together as the auxiliary wheel rolls on the ground, and as the auxiliary wheel moves toward concentric relation with respect to the main wheel.

3. In a device of the class described, main and auxiliary wheels, means for mounting the main wheel for rotation about a fixed axis, means for effecting a detachable pivotal connection between the wheels in offset relation to said axis of rotation of the main wheel, whereby as the main wheel turns about said axis of rotation, the pivotal connection will move in an orbit, thereby causing an elevation of the main wheel during a solely rotative movement of both wheels and while the auxiliary wheel is moving to concentric relation with respect to the main wheel, and automatically-acting latch means on the wheels, coupling them together as they arrive at concentric relation to each other.

In testimony that I claim the foregoing as my own, I have hereto affixed my signature.

JOHN B. RODGERS.